(12) United States Patent
Rodriguez et al.

(10) Patent No.: US 7,021,432 B2
(45) Date of Patent: Apr. 4, 2006

(54) PARK BRAKE LINKAGE

(75) Inventors: William Burt Rodriguez, Evans, GA (US); Harry Kay Voelp, IV, Evans, GA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/828,363

(22) Filed: Apr. 20, 2004

(65) Prior Publication Data

US 2005/0230198 A1    Oct. 20, 2005

(51) Int. Cl.
 *F16D 65/14*    (2006.01)
(52) U.S. Cl. .................. 188/106 P; 188/10; 188/72.7; 188/72.9; 188/21
(58) Field of Classification Search ............ 188/106 R, 188/106 P, 9, 10, 19, 20, 21, 72.7, 72.8, 72.9
See application file for complete search history.

(56) References Cited

U.S. PATENT DOCUMENTS

| | | | | | |
|---|---|---|---|---|---|
| 1,222,839 A | * | 4/1917 | Wright | .................... | 188/106 R |
| 1,826,380 A | * | 10/1931 | Bock | ........................... | 188/10 |
| 1,930,032 A | * | 10/1933 | Apple | .................... | 188/106 R |
| 2,140,040 A | * | 12/1938 | White | ..................... | 188/106 P |
| 2,147,955 A | * | 2/1939 | Baits | ....................... | 188/106 P |
| 2,551,448 A | * | 5/1951 | McGuire | ...................... | 188/10 |
| 3,400,788 A | * | 9/1968 | Brace | ......................... | 188/354 |
| 5,315,893 A | | 5/1994 | Behrens et al. | ............... | 74/512 |
| 6,409,187 B1 | * | 6/2002 | Crow, Jr. | ................. | 280/47.34 |
| 2003/0046915 A1 | | 3/2003 | Samejima et al. | ........... | 56/14.9 |

FOREIGN PATENT DOCUMENTS

| | | |
|---|---|---|
| DE | 936 792 C | 12/1955 |
| DE | 10 18 317 B | 10/1957 |
| DE | 30 01 957 A1 | 7/1981 |
| DE | 199 02 128 A1 | 11/1999 |
| FR | 2 053 430 A | 4/1971 |

* cited by examiner

*Primary Examiner*—Robert A. Siconolfi
*Assistant Examiner*—Bradley T. King

(57) ABSTRACT

A park brake linkage includes a pivotable park brake actuating handle, a park brake bell crank rotatably mounted on a cross shaft, an arm extending radially from the park brake bell crank, and a single connector between the handle and the firs arm to transmit pivoting movement of the handle to rotational movement of the park brake bell crank. A second arm may extend radially and laterally from the park brake bell crank, which may be used to turn a left brake bell crank and a right brake bell crank, each of which may be secured to a separate brake camshaft. Each camshaft has a cam lobe extending therefrom to apply a brake.

18 Claims, 3 Drawing Sheets

PARK BRAKE LINKAGE

FIELD OF THE INVENTION

This invention relates generally to park brake systems for tractors and other vehicles, and more specifically to mechanical linkages for park brake systems.

BACKGROUND OF THE INVENTION

Conventional tractors and other vehicles, including vehicles suited for off-road use, may have a park brake system which includes a manual or hand-operated lever connected through a pair of mechanical linkages to brake units on each of two wheels. Each of the two linkages may include several components that transfer forces necessary to apply and securely hold a brake on a wheel.

For example, each linkage may include one or more bell cranks, wire cable and/or rods. Each linkage for the left and right brake may duplicate one or more components.

Manufacturing costs and assembly time for linkages in park brake systems may relate, at least in part, to the number of components in the linkage. A park brake system is needed that has fewer components in the linkage, lower manufacturing cost, and reduced assembly time.

Park brake systems are serviced periodically for several reasons including or related to wear and tear. For example, cables in both linkages may need to be adjusted or tightened so that both brakes may be applied and will engage with equal pressure. This is one example of an adjustment to a park brake linkage that may be difficult and time intensive. A park brake linkage is needed that will reduce or minimize service requirements.

SUMMARY OF THE INVENTION

A park brake linkage is provided that eliminates duplication of components, reduces manufacturing cost, and shortens assembly time. The park brake linkage also helps reduce or minimize service requirements. Fewer components are used than in conventional park brake linkages.

A single connector extends from the park brake actuation handle to left and right bell cranks on a brake cross shaft. The connector, which may be a rod, extends between the handle and an arm extending radially from a park brake bell crank. The connector transmits pivoting movement of the handle to rotational movement of the park brake bell crank. A second arm may extend radially and laterally from the park brake bell crank, which may be used to turn a left brake bell crank and a right brake bell crank, each of which may be secured to a separate brake camshaft. Each camshaft has a cam lobe extending therefrom which, when rotated, may apply a brake to a separate wheel.

DESCRIPTION OF THE PREFERRED EMBODIMENT

Figure 1:
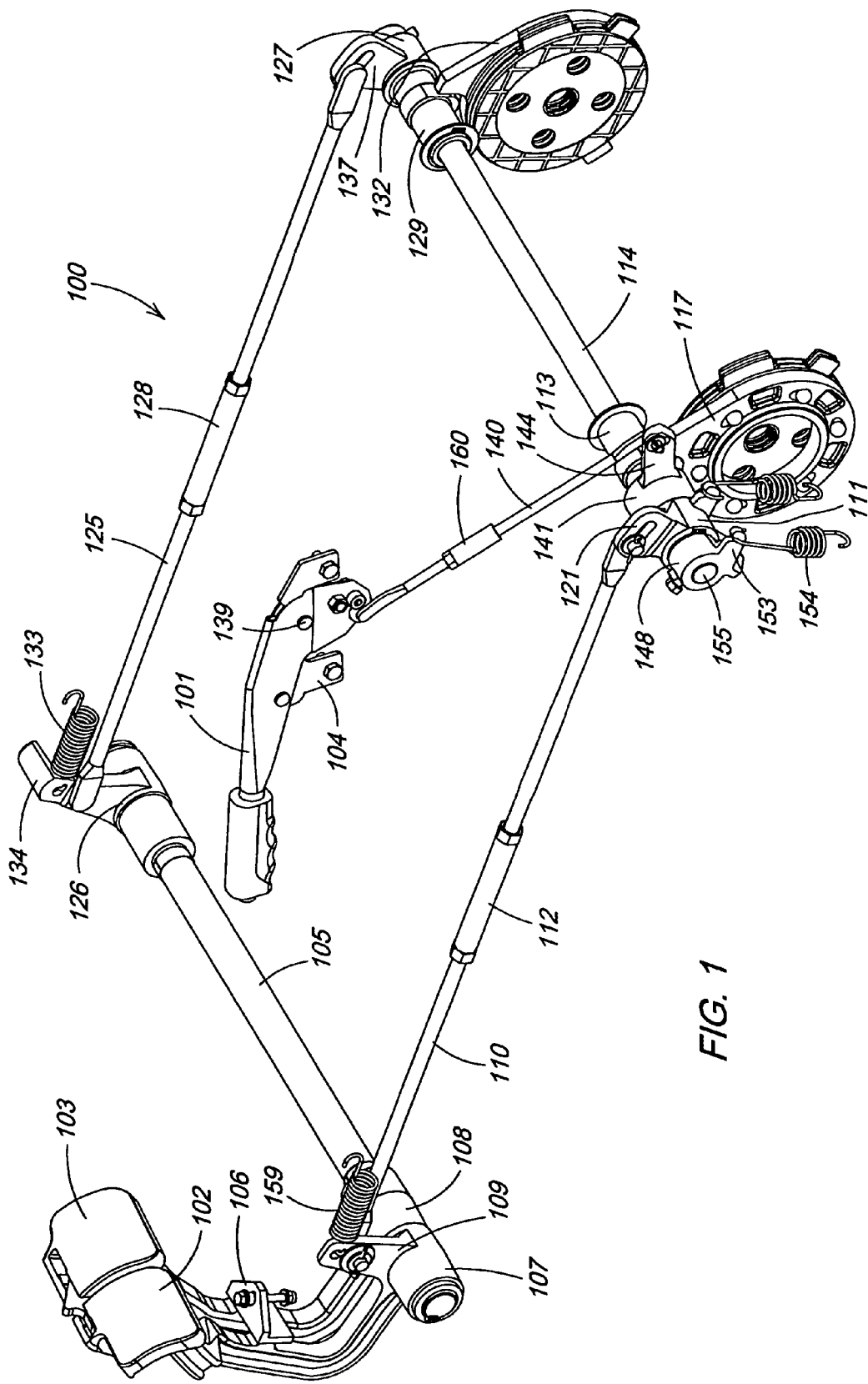
FIG. 1 is a rear perspective view of a brake system for a tractor showing a first embodiment of the park brake linkage.

As shown in FIG. 1, brake system 100 may be in a tractor or other vehicle, including an off-road vehicle. When the park brake is operated, left and right brakes may be applied together. When brake pedals are operated, the left and right brakes may be applied independently of each other.

Park brake actuation handle 101 may be, and in normal use will be, used to apply the brakes on two wheels (i.e., the left and right wheels) of a vehicle. The park brake actuation handle may be positioned at or in the operator station of the vehicle. In one embodiment, handle 101 may be pivotably attached to mounting plate 104 secured to the body or frame.

Brake pedals 102, 103 also may be used to apply brakes independently to each of the left and right wheels. Left brake pedal 102 and right brake pedal 103 may be floor mounted or hanging in the operator station. For example, as shown in FIG. 1, the brake pedals may be floor mounted over brake pedal pivot shaft 105 which may be rotatably mounted to the tractor body or frame. Alternatively, the brake pedals may be positioned to hang below the brake pedal pivot shaft. Stop 106 may be provided to locate both brake pedals at a rest position.

In one embodiment, one of the brake pedals may rotate with respect to the brake pedal pivot shaft, and the other brake pedal may be secured to and rotate together with the shaft. For example, left brake pedal 102 may be attached to sleeve 107 and right brake pedal 103 may be attached to sleeve 108. Sleeve 107 may rotate on the brake pedal pivot shaft, and sleeve 108 may be secured to the brake pedal pivot shaft.

Figure 2:
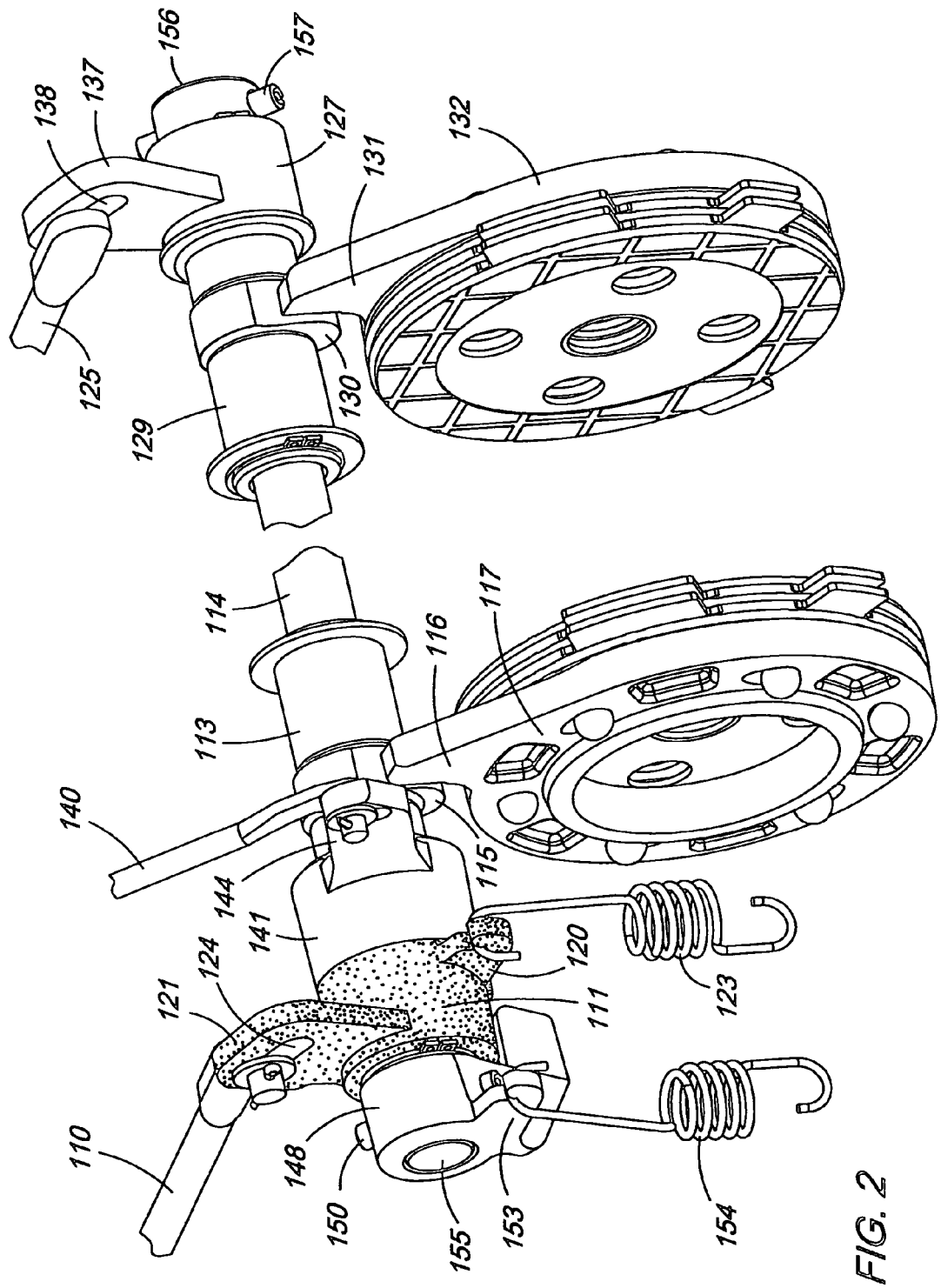
FIG. 2 is an expanded rear perspective view of the park brake linkage according to the first embodiment.

In one embodiment, sleeve 107 may have radially extending arm 109. Left brake rod 110 may extend between arm 109 and left brake main bell crank 111. Left brake rod 110 may include turnbuckle 112 which may be used to change the rod length. When the left brake pedal is applied, sleeve 107 rotates on the brake pedal pivot shaft, moving left brake rod 110 longitudinally to rotate left brake main bell crank 111. The left brake main bell crank may be secured to and rotate together with left brake camshaft 113. As shown in FIG. 2, rotating the left brake camshaft urges cam lobe 115, which is on the left brake camshaft's outer circumference, against projection 116 on plate 117, and then rotates plate 117. Rotation of plate 117 will apply the left wheel brake in a conventional manner understood by those skilled in the art. Return spring 159 may urge the left brake pedal toward the rest position.

Figure 3:
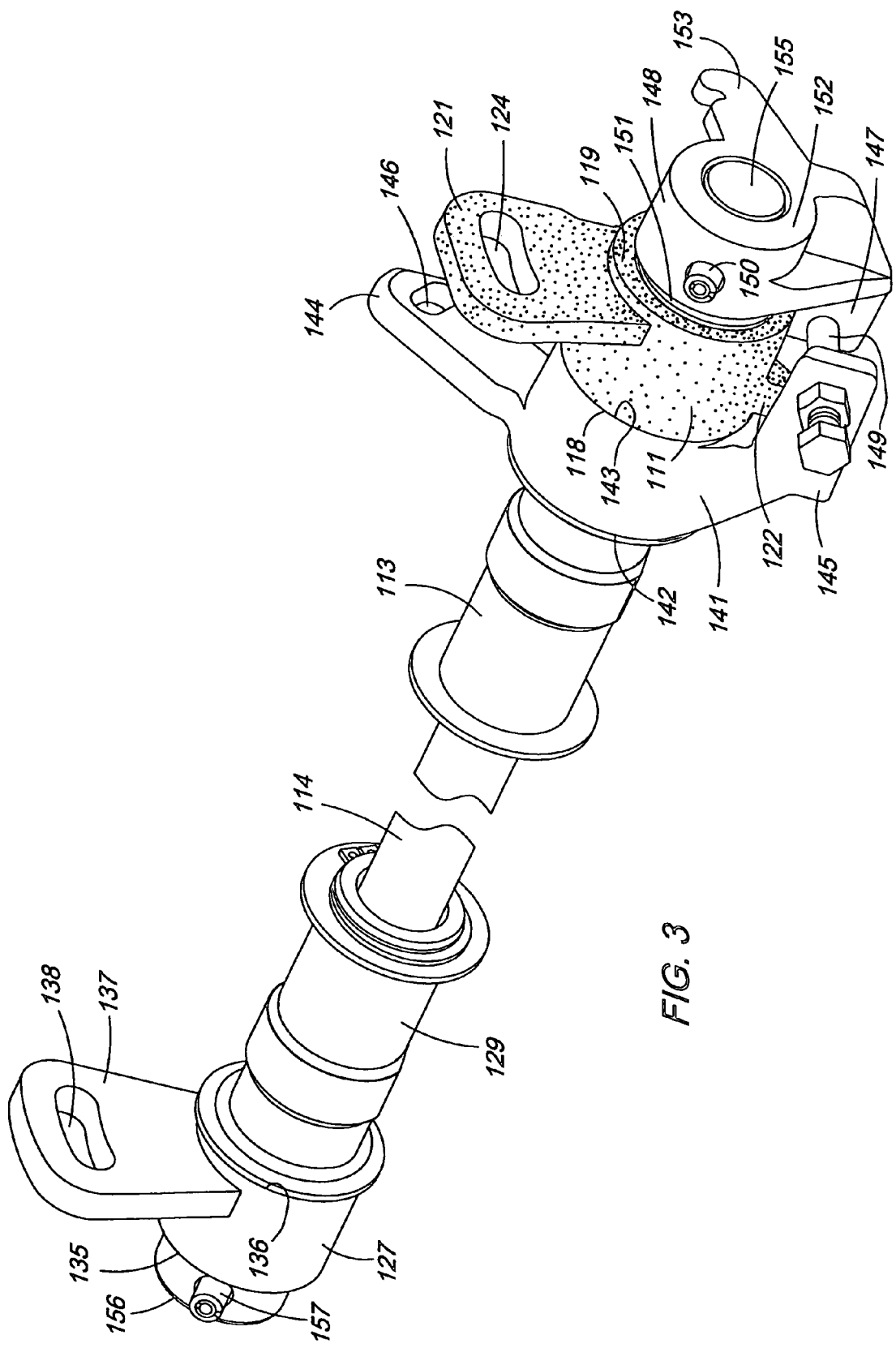
FIG. 3 is an expanded front perspective view of the park brake linkage according to the first embodiment.

In one embodiment, left brake main bell crank 111 may fit around and be secured to left brake camshaft 113. For example, a key may engage slots in the internal diameter of the left brake main bell crank and the external diameter of the left brake camshaft. As shown in FIGS. 2 and 3, the left brake main bell crank may have a generally sleeve-shaped body with first end 118, second end 119, and arms 120, 121, and 122 extending radially from the body. Arm 120 may be connected to return spring 123, to urge the left brake main bell crank toward the rest position. Arm 121 may have slot 124 which may pivotably receive one end of left brake rod 110. Slot 124 may be dimensioned to provide a lost motion mechanism so that application of the park brake does not alter the position of the left brake foot pedal. When the park brake is applied, park brake bell crank 141 may contact arm 122 and rotate the left brake bell crank to apply the left brake.

In one embodiment, right brake rod 125 may extend between right brake front bell crank 126 and right brake main bell crank 127. Right brake rod 125 may include turnbuckle 128 which may be used to change the rod length. When the right brake pedal is applied, brake pedal pivot shaft 105 and right brake front bell crank 126 rotate together, moving right brake rod 125 longitudinally and rotating right brake main bell crank 127. Right brake main bell crank 127 may be secured to right brake camshaft 129, both of which may be secured to brake cross shaft 114 with a key or similar device. Rotating the right brake camshaft urges cam lobe 130, which is on the right brake camshaft's outer circumference, against projection 131 on plate 132, and then rotates plate 132. Rotation of plate 132 will apply the right wheel brake in a conventional manner understood by those skilled in the art. Return spring 133 may be connected to arm 134, to urge the right brake pedal back toward the rest position.

In one embodiment, right brake main bell crank 127 may fit around and be secured to right brake camshaft 129. For example, a key may engage slots in the internal diameter of the right brake main bell crank and the external diameter of the right brake camshaft. The right brake main bell crank and the right brake camshaft may be secured to brake cross shaft 114, and may rotate together with the brake cross shaft. As shown in FIGS. 2 and 3, right brake main bell crank 127 may have a generally sleeve-shaped body with first end 135, second end 136, and arm 137 extending radially from the body. Arm 137 may have slot 138 which may pivotably receive one end of right brake rod 125. Slot 138 may be dimensioned to provide a lost motion mechanism so that application of the park brake does not alter the position of the right brake foot pedal.

Park brake actuation handle 101 may be used to apply both the left and right brakes. When the handle is pulled, it may pivot on axis 139 adjacent the first end of the handle, and move connector 140 longitudinally to rotate park brake bell crank 141. In one embodiment, connector 140 may be a rod that connects the first end of the handle to park brake bell crank 141. The connector may include turnbuckle 160 to adjust the length. Rotating the park brake bell crank rotates the left and right brake camshafts so that cam lobes 115, 130 on the outer circumference of the camshafts abut projections 116, 131 on plates 117, 132, and then rotate the plates to apply the left and right brakes. A latch (not shown) may releasably lock the park brake actuation handle in the park brake position.

In one embodiment, park brake bell crank 141 may be dimensioned to fit around left brake camshaft 113. A bearing may be pressed into the internal diameter of the park brake bell crank. For example, the bearing may be a dry bearing made from or including an elastomeric material. As shown in FIGS. 2 and 3, park brake bell crank 141 may have a generally sleeve-shaped body, first end 142, second end 143, and arms 144, 145 extending from the body. Arm 144 extends radially from the park brake bell crank adjacent the first end. Arm 144 may include slot 146 which may pivotably receive one end of connector 140. Slot 146 may be dimensioned to provide a lost motion mechanism so that application of either or both brake pedals does not alter the position of the park brake bell crank and park brake actuation handle.

In one embodiment, as shown in FIG. 3, arm 145 may extend radially and longitudinally from the second end of park brake bell crank 141. When handle 101 is actuated and park brake bell crank 141 is rotated, arm 145 may abut and push against arm 122 extending radially from left brake main bell crank 111 and arm 147 extending radially from right brake secondary bell crank 148. Arm 145 may push against arms 122 and 147 sufficiently to turn the left brake main bell crank and right brake secondary bell crank, rotating the left and right brake camshafts to apply the left and right brakes.

In one embodiment, adjustment device 149 may set the relative position of park brake bell crank 141 with respect to left brake main bell crank 111 and right brake secondary bell crank 148. The adjustment device may be used to equally distribute force from the park brake actuation handle to the left and right brakes. For example, the adjustment device may be an externally threaded member that may engage an internally threaded passage in arm 145, and a nut to lock the externally threaded member in a desired position. The position of the park brake bell crank with respect to each of arms 122, 147 then may be adjusted as needed.

Right brake secondary bell crank 148 may have an internal diameter dimensioned to fit around brake cross shaft 114, and may be secured to the brake cross shaft. For example, roll pin 150 may be inserted through corresponding holes in the right brake secondary bell crank and brake cross shaft. The right brake secondary bell crank may have a generally sleeve-shaped body with first end 151, second end 152, and arms 147, 153 extending from the body. When the park brake bell crank is rotated, arm 145 (acting through adjustment device 149 extending from arm 145) may abut and push against arm 147 which extends radially and longitudinally from the right brake secondary bell crank, rotating the right brake secondary bell crank and right brake camshaft to apply the right brake. Arm 153 may extend radially from the right brake secondary bell crank and be connected to return spring 154, for urging the right brake secondary bell crank toward the rest position.

In one embodiment, left brake camshaft 113 and right brake camshaft 129 may be generally sleeve-shaped members having internal diameters dimensioned to fit over brake cross shaft 114. Left brake camshaft 113 may extend through park brake bell crank 141 and left brake main bell crank 111. Left brake camshaft 113 may terminate at or adjacent second end 119 of left brake main bell crank 111, so that it is spaced from first end 155 of the brake cross shaft. Right brake camshaft may extend through right brake main bell crank 127. Right brake camshaft may terminate at or near second end 156 of the brake cross shaft. Left brake camshaft 113 may rotate on brake cross shaft 114, and right brake camshaft 129 may be secured to brake cross shaft 114. For example, roll pin 157 may be inserted through corresponding holes in the right brake camshaft and brake cross shaft.

One or more lock rings may be positioned and locked on camshafts 113 and/or 129 to locate and maintain their axial positions with respect to a transmission and/or one or more other components. For example, lock rings may be placed between left brake bell crank 111 and right brake secondary bell crank 148.

The park brake linkage described above significantly reduce the number of components compared to conventional park brake systems. Instead of a pair of linkages, a single linkage connects the park brake actuation handle and a left and a right bell crank on a brake cross shaft. As a result, manufacturing costs may be reduced and assembly time may be lower than with conventional park brake systems.

Having described the preferred embodiment, it will become apparent that various modifications can be made without departing from the scope of the invention as defined in the accompanying claims.

The invention claimed is:
1. An apparatus comprising:
   a pivotable park brake actuating handle;
   a park brake bell crank rotatably mounted on a cross shaft;
   a first arm extending radially from the park brake bell crank;
   a connector between the handle and the first arm to transmit pivoting movement of the handle to rotational movement of the park brake bell crank; and
   a second arm extending radially and laterally from the park brake bell crank; the second arm adapted to turn a left brake bell crank and a right brake bell crank, the left brake bell crank secured to a left brake camshaft and the right brake bell crank secured to a right brake camshaft, one of the left and right brake camshafts being secured to the cross shaft, each camshaft having a cam lobe to apply a brake.

2. The apparatus of claim 1 further comprising an adjustment device between the second arm and at least one of the left and right brake bell cranks.

3. The apparatus of claim 1 further comprising a slot in the first arm, the slot pivotably engaging the connector.

4. The apparatus of claim 1 wherein one of the left and right brake camshafts is rotatable with respect to the cross shaft.

5. The apparatus of claim 1 wherein one of the left and right brake bell cranks comprises a main bell crank and a secondary bell crank secured to the cross shaft.

6. An apparatus comprising:
   a pivotable park brake actuating handle;
   a park brake bell crank rotatably mounted on a cross shaft;
   a first arm extending radially from the park brake bell crank;
   a connector between the handle and the first arm to transmit pivoting movement of the handle to rotational movement of the park brake bell crank; and
   a second arm extending radially and laterally from the park brake bell crank; the second arm adapted to turn a left brake bell crank and a right brake bell crank, the left brake bell crank secured to a left brake camshaft and the right brake bell crank secured to a right brake camshaft, one of the left and right brake camshafts being secured to the cross shaft, each camshaft having a cam lobe to apply a brake; and
   a left brake pedal and a right brake pedal, the left brake pedal connected to the left brake bell crank, and the right brake pedal connected to the right brake bell crank and
   a brake pedal pivot shaft, the left brake pedal pivotable with respect to the shaft and the right brake pedal secured to the shaft.

7. An apparatus comprising:
   a brake cross shaft having a park brake bell crank rotatably mounted thereto, a first brake camshaft rotatably mounted thereto, and a second brake camshaft secured thereto;
   a pivotable park brake actuation handle; and
   a single connector between the park brake actuation handle and the park brake bell crank, the handle pivotable to move the connector longitudinally to rotate the park brake bell crank, the park brake bell crank turning a first bell crank and the first brake camshaft which in turn rotates a second bell crank and the second brake camshaft to apply both a first brake and a second brake.

8. The apparatus of claim 7 wherein the connector is a rod.

9. The apparatus of claim 7 further comprising an arm extending from the park brake bell crank to turn both the first and the second brake camshafts.

10. The apparatus of claim 9 further comprising an adjustment device on the arm to adjust the position of the park brake bell crank with respect to the first and the second brake camshafts.

11. The apparatus of claim 7 further comprising a first brake bell crank secured to the first brake camshaft, and a pair of second brake bell cranks secured to second brake camshaft and the brake cross shaft.

12. The apparatus of claim 11 further comprising a slot in the first brake bell crank secured to the first brake camshaft, the slot pivotably receiving a rod connecting to a brake pedal.

13. The apparatus of claim 11 further comprising a slot in the pair of second brake bell cranks secured to the second brake camshaft and brake cross shaft, the slot pivotably receiving a rod connecting to a brake pedal.

14. An apparatus comprising:
   a first brake pedal pivotably connected to a first rod, the first rod connecting the first brake pedal to a first brake bell crank, the first brake bell crank secured to a first brake camshaft, the first rod being longitudinally movable in response to application of the first brake pedal to rotate the first brake bell crank and first brake camshaft to apply a first brake;
   a second brake pedal pivotably connected to a second rod, the second rod connecting the second brake pedal to a second brake bell crank, the second brake bell crank secured to a second brake camshaft, the second rod being longitudinally movable in response to application of the second brake pedal to rotate the second brake bell crank and second brake camshaft to apply a second brake; and
   a park brake actuation handle pivotably connected to a third rod, the third rod connecting the park brake actuation handle to a park brake bell crank, the park brake bell crank having an arm extending therefrom, the third rod being longitudinally movable in response to application of the park brake actuation handle to rotate the park brake bell crank sufficiently so that the arm pushes against and rotates the first brake bell crank and the second brake bell crank to apply both the first brake and the second brake.

15. The apparatus of claim 14 further comprising a brake cross shaft, and wherein the first brake bell crank, the first brake camshaft, the second brake bell crank, and the second brake camshaft all have internal diameters to fit over the brake cross shaft.

16. The apparatus of claim 15 wherein the second brake bell crank and the second brake camshaft are secured to the brake cross shaft.

17. The apparatus of claim 14 wherein the arm extends radially and longitudinally from the park brake bell crank.

18. The apparatus of claim 14 further comprising a cam lobe extending from each of the first and the second brake camshafts, each cam lobe abutting a projection on the outer diameter of a plate, each plate being rotatable to apply a brake.

* * * * *